(12) United States Patent
Hirai et al.

(10) Patent No.: US 10,587,085 B2
(45) Date of Patent: Mar. 10, 2020

(54) ROTARY CONNECTOR AND FIXING STRUCTURE OF ROTARY CONNECTOR

(71) Applicants: FURUKAWA ELECTRIC CO., LTD., Tokyo (JP); FURUKAWA AUTOMOTIVE SYSTEMS INC., Inukami-gun (JP); TOYOTA JIDOSHA KABUSHIKI KAISHA, Toyota-shi (JP); KABUSHIKI KAISHA TOKAI RIKA DENKI SEISAKUSHO, Niwa-gun (JP)

(72) Inventors: Shuji Hirai, Tokyo (JP); Kazutaka Kamiya, Tokyo (JP); Toshihiko Kosugi, Tokyo (JP); Shigeo Shigeyama, Tokyo (JP); Nobuyuki Ishigure, Tokyo (JP); Yoshio Chiba, Tokyo (JP); Kunihiko Ikegame, Tokyo (JP); Hideki Matsumura, Tokyo (JP); Tadashi Usuya, Tokyo (JP)

(73) Assignees: FURUKAWA ELECTRIC CO., LTD., Tokyo (JP); FURUKAWA AUTOMOTIVE SYSTEMS INC., Inukami-gun (JP); TOYOTA JIDOSHA KABUSHIKI KAISHA, Toyota-shi (JP); KABUSHIKI KAISHA TOKAI RIKA DENKI SEISAKUSHO, Niwa-gun (JP)

( * ) Notice: Subject to any disclaimer, the term of this patent is extended or adjusted under 35 U.S.C. 154(b) by 0 days.

(21) Appl. No.: 16/304,492

(22) PCT Filed: Apr. 28, 2017

(86) PCT No.: PCT/JP2017/017003
§ 371 (c)(1),
(2) Date: Nov. 26, 2018

(87) PCT Pub. No.: WO2017/203935
PCT Pub. Date: Nov. 30, 2017

(65) Prior Publication Data
US 2019/0221979 A1 Jul. 18, 2019

(30) Foreign Application Priority Data
May 26, 2016 (JP) ................................ 2016-104762

(51) Int. Cl.
*H01R 39/00* (2006.01)
*H01R 35/04* (2006.01)
(Continued)

(52) U.S. Cl.
CPC ........... *H01R 35/04* (2013.01); *B60R 16/027* (2013.01); *B62D 1/10* (2013.01); *H01R 12/7011* (2013.01);
(Continued)

(58) Field of Classification Search
CPC .. H01R 35/04; H01R 12/7011; H01R 35/025; H01R 39/02; H01R 2201/26; B60R 6/027
(Continued)

(56) References Cited

U.S. PATENT DOCUMENTS

| 4,561,153 A | 12/1985 | Matsui |
| 2002/0131846 A1 | 9/2002 | Kojima |
| 2017/0033477 A1 | 2/2017 | Ichikawa et al. |

FOREIGN PATENT DOCUMENTS

| EP | 0 764 788 A1 | 3/1997 |
| EP | 1 058 067 A2 | 12/2000 |

(Continued)

OTHER PUBLICATIONS

International Search Report dated Jul. 18, 2017 in PCT/JP2017/017003 filed on Apr. 28, 2017.
(Continued)

*Primary Examiner* — Khiem N Nguyen
(74) *Attorney, Agent, or Firm* — Oblon, McClelland, Maier & Neustadt, L.L.P.

(57) ABSTRACT

Looseness of a rotary connector and lifting of the rotary connector which occurs depending on a harness wiring state are prevented, to reduce inconvenience such as generation of an abnormal sound due to the rotary connector contacting a steering wheel.

In a fixing structure of a rotary connector, which includes a projecting piece 15 to fix the rotary connector to a combination switch and a locked portion 22a to be locked by the projecting piece 15 and in which a laterally protruding locking claw 31 is formed in a tip portion of the projecting piece 15, the locking claw 31 of the projecting piece 15 is integrally provided with a flexible urging portion 15a that displaces and urges the locking claw 31 in a locking direction. A contact surface 32 is formed on the locking claw 31, the contact surface 32 obliquely coming into contact with a locking side corner 23 of the locked portion 22a from the opposing side.

20 Claims, 19 Drawing Sheets

(51) Int. Cl.
*B62D 1/10* (2006.01)
*B60R 16/027* (2006.01)
*H01R 12/70* (2011.01)
*H01R 35/02* (2006.01)
*H01R 39/02* (2006.01)

(52) U.S. Cl.
CPC .......... *H01R 35/025* (2013.01); *H01R 39/02* (2013.01); *H01R 2201/26* (2013.01)

(58) Field of Classification Search
USPC ...................................................... 439/13, 34
See application file for complete search history.

(56) References Cited

FOREIGN PATENT DOCUMENTS

| | | |
|---|---|---|
| EP | 1 182 090 A2 | 2/2002 |
| EP | 1 520 998 A1 | 4/2005 |
| JP | 2001-1909 A | 1/2001 |
| JP | 3273540 B2 | 4/2002 |
| JP | 2002-151191 A | 5/2002 |
| JP | 2007-315467 A | 12/2007 |
| JP | 2015-207404 A | 11/2015 |
| TW | 201547132 A | 12/2015 |

OTHER PUBLICATIONS

International Search Report dated Jul. 18, 2017 in PCT/JP2017/017003 (English translation previously filed), 4 pages.
Chinese Office Action dated Sep. 17, 2019, in Patent Application No. 201780032982.4 (with English translation), 11 pages.
Japanese Office Action dated Sep. 26, 2019 in Patent Application No. 2016-104762 (with English translation), 8 pages.
Office Action dated Jun. 20, 2019 in Japanese Patent Application No. 2016-104762 (with English translation).
European Search Report dated Jan. 8, 2020, in corresponding Application No. 17802532.6.

Fig. 5
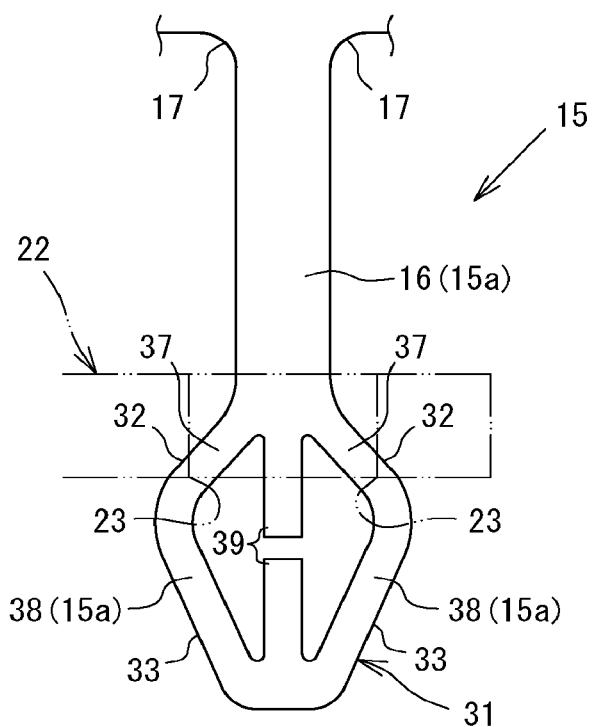
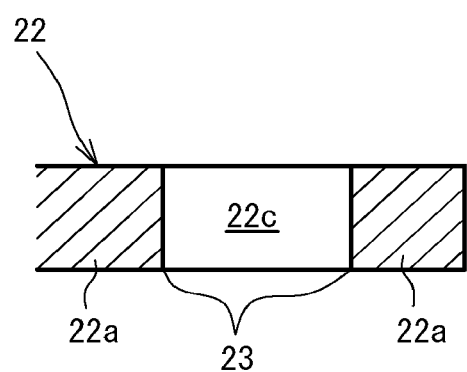

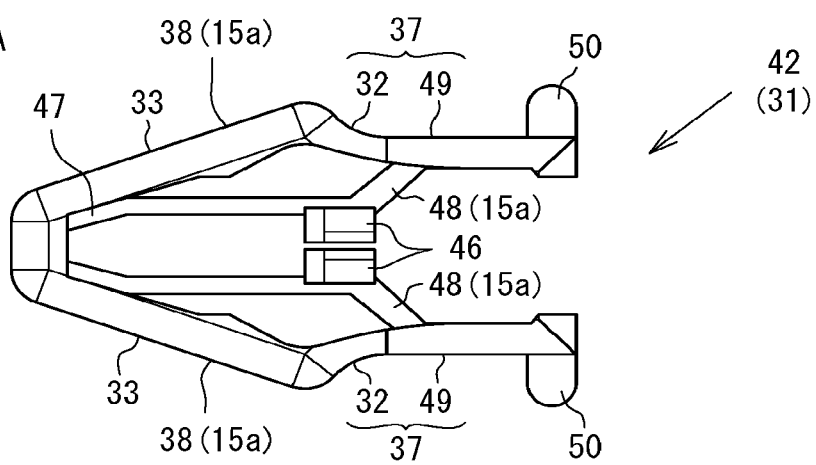
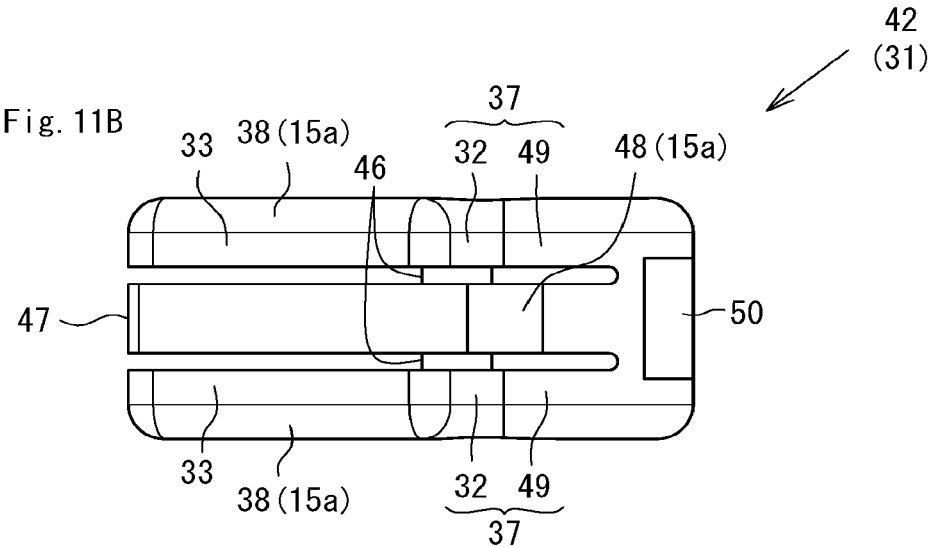

ROTARY CONNECTOR AND FIXING STRUCTURE OF ROTARY CONNECTOR

TECHNICAL FIELD

The present invention relates to a rotary connector for fixing a rotary connector provided below a steering wheel of a vehicle to a combination switch, and more particularly to a rotary connector capable of preventing generation of an abnormal sound in a fixed state.

BACKGROUND ART

The rotary connector is used as electrical connection means of, for example, an air bag system. The rotary connector includes a rotator fixed to a steering wheel mounted with an air bag, and a stator rotatably supporting the rotator, and accommodates a flexible flat cable in a wound state in an internal space formed by the rotator and the stator. With this configuration, even when the rotator rotates with the rotation of the steering wheel, the electrical connection state can be maintained.

In a fixing structure for fixing the rotary connector to the combination switch, locking is used so that fixing work can be performed more easily as compared to the case of using a screw. That is, as shown in FIG. 17, projecting pieces 103 are formed on a stator 102 of a rotary connector 101, and as shown in FIG. 18, a locked portion 104 to which the projecting piece 103 is locked is formed in a bracket of a combination switch.

The projecting piece 103 has a rod shape rectangular in cross section, and at the tip portion of the projecting piece 103, a locking claw 105 is formed which protrudes laterally, relatively moves with respect to the locked portion 104, and is locked to the locked portion 104 when passing over the locked portion 104.

At the time of the fixing, the projecting piece 103 is elastically deformed in a stage before the locking claw 105 is locked to the locked portion 104, and after the locking claw 105 has passed over the locked portion 104, the projecting piece 103 elastically returns to the normal state, whereby the locking claw 105 is locked to the opposing side of the locked portion 104.

However, in such a locking structure, in order to return the elastically deformed projecting piece 103 to the original shape, a certain clearance needs to be provided between the locking claw 105 and the locked portion 104 facing the locking claw 105. Hence there is a drawback that looseness occurs in a direction in which the projecting piece 103 is inserted.

When such looseness occurs, an abnormal sound tends to occur. Moreover, as shown in FIG. 19, the rotary connector 101 is provided between a steering wheel 106 and a combination switch 107, and since a harness for electrical connection is provided in the rotary connector 101 on each of the steering wheel side and the steering column side, the harness may push up the rotary connector 101 depending on a wiring state of the harness (not shown) as indicated by an arrow in FIG. 19. In this case, the pushed-up rotary connector 101 may contact the steering wheel 106 to cause generation of the abnormal sound and other inconveniences.

For preventing the looseness of the rotary connector, a technique such as Patent Document 1 described below has been disclosed. A mounting structure of this technique includes a displacement absorbing member for preventing looseness, and an elastic piece or a cushioning material elastically striking the combination switch is provided on a stator.

With such a configuration, the displacement absorbing member brings the rotary connector into a pushed-up state, so that the rotary connector can be prevented from being lifted unexpectedly. However, a space is required between the rotary connector and the combination switch, and furthermore, extra materials and members are required. This makes it impossible to reduce the size and cost. Especially, when the cushioning material is provided, deterioration in the material and dropout of the cushioning material are considered, and it is difficult to maintain the effect.

PRIOR ART DOCUMENTS

Patent Document

Patent Document 1: Japanese Patent No. 3273540

SUMMARY OF THE INVENTION

Problems to be Solved by the Invention

Accordingly, it is a main object of the present invention to be able to prevent looseness and unexpected lifting of a rotary connector.

Solutions to the Problems

Means for solving the problem is a rotary connector which includes a projecting piece to be fixed to a combination switch, and in which a laterally protruding locking claw is formed in a tip portion of the projecting piece, the connector including: a flexible urging portion integrally formed on the locking claw in the projecting piece and displaces and urges the locking claw in a locking direction; and a contact surface that is formed on the locking claw and obliquely comes into contact with a locked portion.

Another means for solving the problem is a fixing structure of a rotary connector, which includes a projecting piece to fix the rotary connector to a combination switch and a locked portion to be locked by the projecting piece, and in which a laterally protruding locking claw is formed in a tip portion of the projecting piece, the structure including: a flexible urging portion integrally formed on the locking claw in the projecting piece and displaces and urges the locking claw in a locking direction; and a contact surface that is formed on the locking claw and obliquely comes into contact with a locked portion.

With these configurations, when relative movement is performed between the projecting piece and the locked portion and the projecting piece moves toward the locked portion, the locking claw of the projecting piece hits the locked portion to cause bending of at least the urging portion and lateral movement of the locking claw. The movement of the locking claw is allowed by the bending of the urging portion, and after the locking claw has passed over the locked portion by further movement, the locking claw moves in the locking direction and is locked to the locked portion. At this time, the contact surface of the locking claw obliquely comes into contact with the locked portion, specifically, a corner part on the locking side of the locked portion, to hold the positional relationship between the projecting piece and the locked portion. It is thus possible to prevent looseness and unexpected lifting of the rotary connector.

As an aspect of the present invention, it is possible to provide a rotary connector in which the contact surface is an inclined surface or a concave rounded surface.

With this configuration, the contact surface can be steplessly locked to the locked portion, and the urging force by the urging portion can be caused to act favorably.

As an aspect of the present invention, it is possible to provide a rotary connector in which the urging portion is formed in a part closer to a base side than the locking claw in the projecting piece.

With this configuration, the urging portion that constitutes the whole or a part of the projecting piece supports the locking claw and exerts an urging force by elastic deformation of tilting while bending. The deforming motion of the urging portion is simple and can also contribute to simplification of the shape of the projecting piece.

As an aspect of the present invention, it is possible to provide a rotary connector in which a pair of the contact surfaces are formed laterally. Preferably, a pair of contact surfaces are provided laterally outward, and the locked portions are provided in parts facing each other in one hole.

With this configuration, the pair of contact surfaces are both locked to the locked portions, so that the positional relationship between the projecting piece and the locked portion can be held more strongly.

In the case of this configuration, the urging portion may be formed in a section connecting the pair of contact surfaces.

With this configuration, the urging portion urges the pair of contact surfaces to protrude laterally, so as to enable enhancement of the urging force as compared to the case where the urging portion is provided only in the part closer to the base side than the locking claw in the projecting piece.

Further, in the case of this configuration, the section connecting the pair of contact surfaces may form a tip of the projecting piece.

With this configuration, the section connecting the pair of contact surfaces can have a reliable and favorable locked state of the contact surface by forming the tip of the projecting piece into a shape that is, for example, tapered and easy to insert into the locked portion.

As an aspect of the present invention, it is possible to provide a rotary connector in which a protrusion that laterally protrudes most of the locking claw is continuously formed at an angle smaller than 180 degrees from the contact surface near a tip position in an insertion direction of the contact surface in the locking claw.

With this configuration, the protrusion is inserted to the locked portion of the projecting piece, and when the locking claw passes through the locked portion, the protrusion tends to be restored by the urging force and notifies the passing of the locking claw through the locked portion to a person performing the fixing work with tactile and sound. The protrusion having once passed over the locked portion can reliably prevent the rotary connector from being lifted above a certain level.

Effects of the Invention

According to the present invention, it is possible to prevent looseness and unexpected lifting of the rotary connector.

BRIEF DESCRIPTION OF THE DRAWINGS

FIG. 5 is a partial sectional side view showing a separated state of a fixing structure according to another example.

FIG. 11A is a side view of a locking claw in the projecting piece of FIG. 9, and FIG. 11B is a plan view thereof.

EMBODIMENTS OF THE INVENTION

Figure 1:
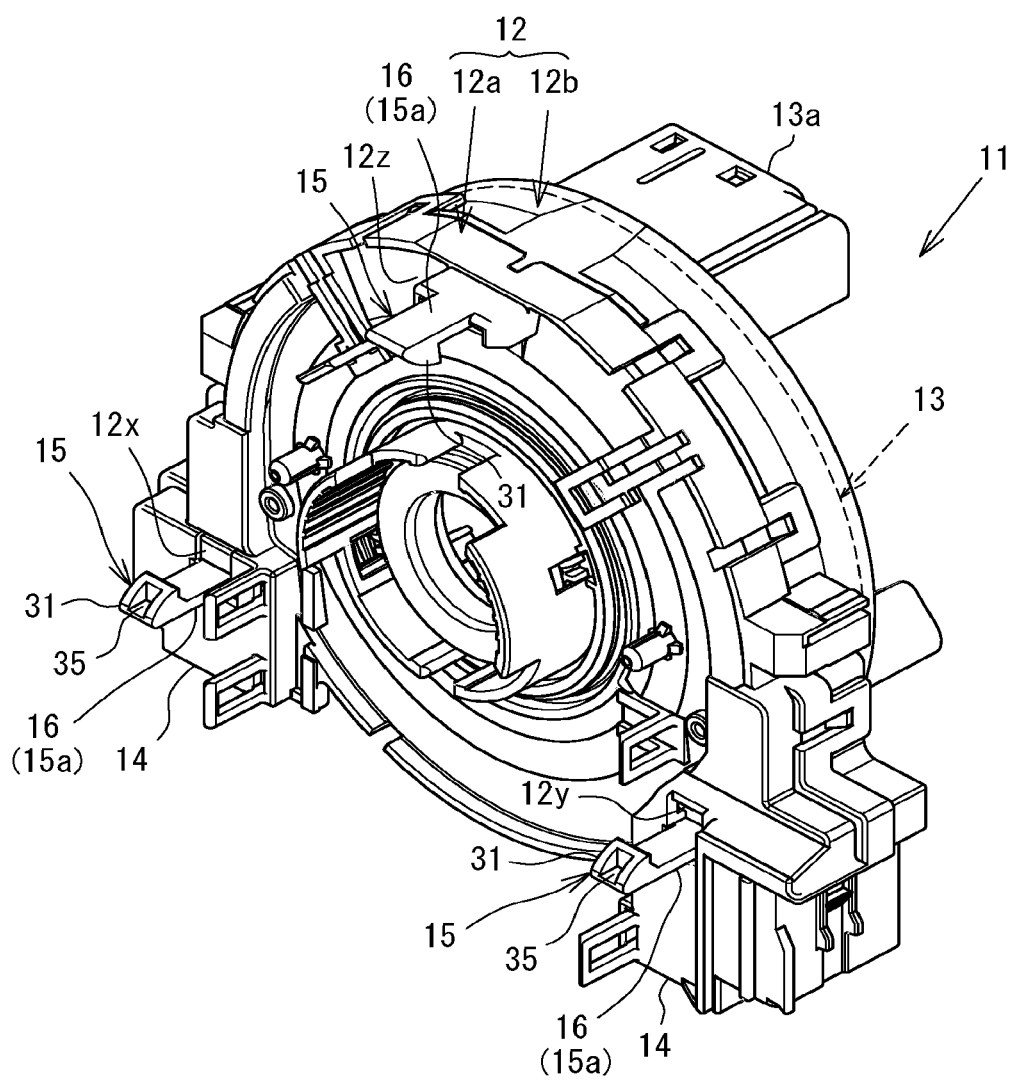
FIG. 1 is a perspective view showing a lower surface side of a rotary connector.

An embodiment for carrying out the present invention will be described below with reference to the drawings.

First, a schematic structure of a rotary connector 11 shown in FIG. 1 will be described.

This rotary connector 11 electrically connects a steering wheel and a combination switch in a car. FIG. 1 shows the lower surface of the rotary connector 11, namely, the surface on the side which is fixed to the combination switch 21 shown in FIG. 2. A plurality of receiving portions 22 are formed in the combination switch 21 for the fixing.

The rotary connector 11 has a substantially annular shape with a circular hole at the center, and is provided with a stator 12 as a fixed side member located on the lower surface side, and a rotator 13 as a rotary side member located on the upper surface side. The stator 12 and the rotator 13 are made of synthetic resin.

The stator 12 is made up of a fixed side ring plate member 12a having a substantially annular shape, and a circumferential tubular member 12b having a circular shape in a plan view and is locked to the upper surface of the circumferential side section in the fixed side ring plate member 12a.

On the circumferential side of the stator 12, two right and left connector housings 14 which protrude outward are formed. A connector (not shown) is built in the connector housing 14. These connector housings 14 are located in both side portions which become lower side when assembled in the car.

The lower surface of the fixed side ring plate member 12a of the stator 12 is provided with projecting pieces 15 to be fixed to a combination switch 21. The projecting pieces 15 are arranged in three places in the circumferential section of the fixed side ring plate member 12a so as to form a triangle when connected. Positions in which the three projecting pieces 15 are formed are positions 12x, 12y near the above-mentioned two connector housings 14 on the stator 12 and a position 12z apart from these connector housings 14.

The rotator 13 is formed into an annular shape having an inverted L-shape in cross section so as to be able to form on the stator 12 an annular accommodating space in which a flexible flat cable, not shown, is accommodated. In FIG. 1, reference numeral 13a denotes a connector housing integrally formed on the rotator 13, and a connector (not shown) is built also in this connector housing.

Next, a description will be given of the projecting piece 15 constituting the fixing structure of the rotary connector 11 and a receiving portion 22 including a locked portion 22a to which the projecting piece 15 is locked.

Figure 3:
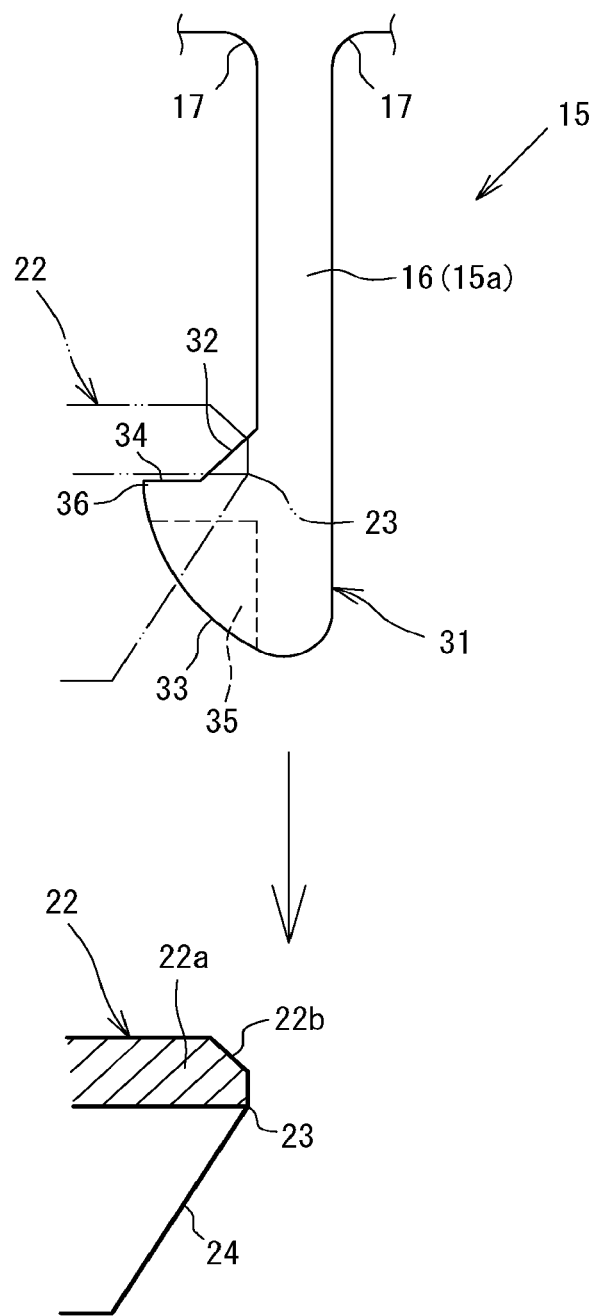
FIG. 3 is a partial sectional side view showing a separated state of a fixing structure.

The projecting piece 15 is a rod having an appropriate length set based on the distance between the projecting piece 15 and the receiving portion 22, and a locking claw 31 is formed at a tip portion of the projecting piece 15. As shown in FIG. 3, while protruding laterally, namely, in a lateral direction with respect to a long length direction of the projecting piece 15, the locking claw 31 relatively moves with respect to the receiving portion 22, passes over the locked portion 22a of the receiving portion 22, and is then locked to the locked portion 22a.

The locking claw 31 is integrally provided with a flexible urging portion 15a that displaces and urges the locking claw 31 in a locking direction. A contact surface 32 is formed on the locking claw 31, the contact surface 32 obliquely coming into contact with a locking side corner 23 of the receiving portion 22 from the opposing side. The contact surface 32 is formed at a position where the urging force is exerted on the receiving portion 22 by bending the urging portion 15a in a contact state. In other words, the contact surface 32 is formed in such a position as to interfere with the locking side corner 23 in the locked portion 22a of the receiving portion 22 in a normal state.

In the examples shown in FIGS. 1 and 3, the locking claws 31 protrude only on one side of a rod-like portion 16 which is a body of the projecting piece 15. Specifically, the rod-like portion 16 is rectangular in cross section and has the same thickness from a base to the locking claw 31. The locking claws 31 are formed on one surface constituting the long side of the rod-like portion 16 in cross section. As shown in FIG. 3, the locking claws 31 protrude in a substantially triangular shape in a side view, and a driven surface 33 inclined so as to protrude rearward from the tip is formed with a convex curved surface bulging outward. The driven surface 33 is a portion which hits the receiving portion 22 and receives a deforming action at the time of fixing.

At the lower end of the driven surface 33, a horizontal surface 34 is formed in a direction to the rod-like portion 16, and the contact surface 32 described above is formed between the horizontal surface 34 and the rod-like portion 16. The contact surface 32 is formed of a flat inclined surface. The contact surface 32 may be a concave rounded surface instead of the inclined surface. An angle of inclination of the contact surface 32 is appropriately set but may, for example, be an angle of 30 degrees to 60 degrees, preferably about 45 degrees, with respect to the long length direction of the rod-like portion 16. In FIG. 1, reference numeral 35 denotes a recess for lightening.

A corner portion in which the driven surface 33 and the horizontal surface 34 are joined is a protrusion 36 that laterally protrudes most of the locking claw 31, continuously at an angle smaller than 180 degrees from the contact surface 32 near a tip position in the insertion direction of the contact surface 32 in the locking claw 31.

In the case of the projecting piece 15 having such a shape that the locking claw 31 is provided on one side of the rod-like portion 16, the rod-like portion 16 is elastically deformed in a direction in which the locking claw 31 is provided and in the opposite direction and bends to displace the locking claws 31, so that the whole of the rod-like portion 16, namely, the whole of a part closer to the base side than the locking claw 31 in the projecting piece 15 constitutes the urging portion 15a described above.

A corner rounded surface 17 is formed in a part on the bending direction side at a base part of the projecting piece 15.

Figure 2:
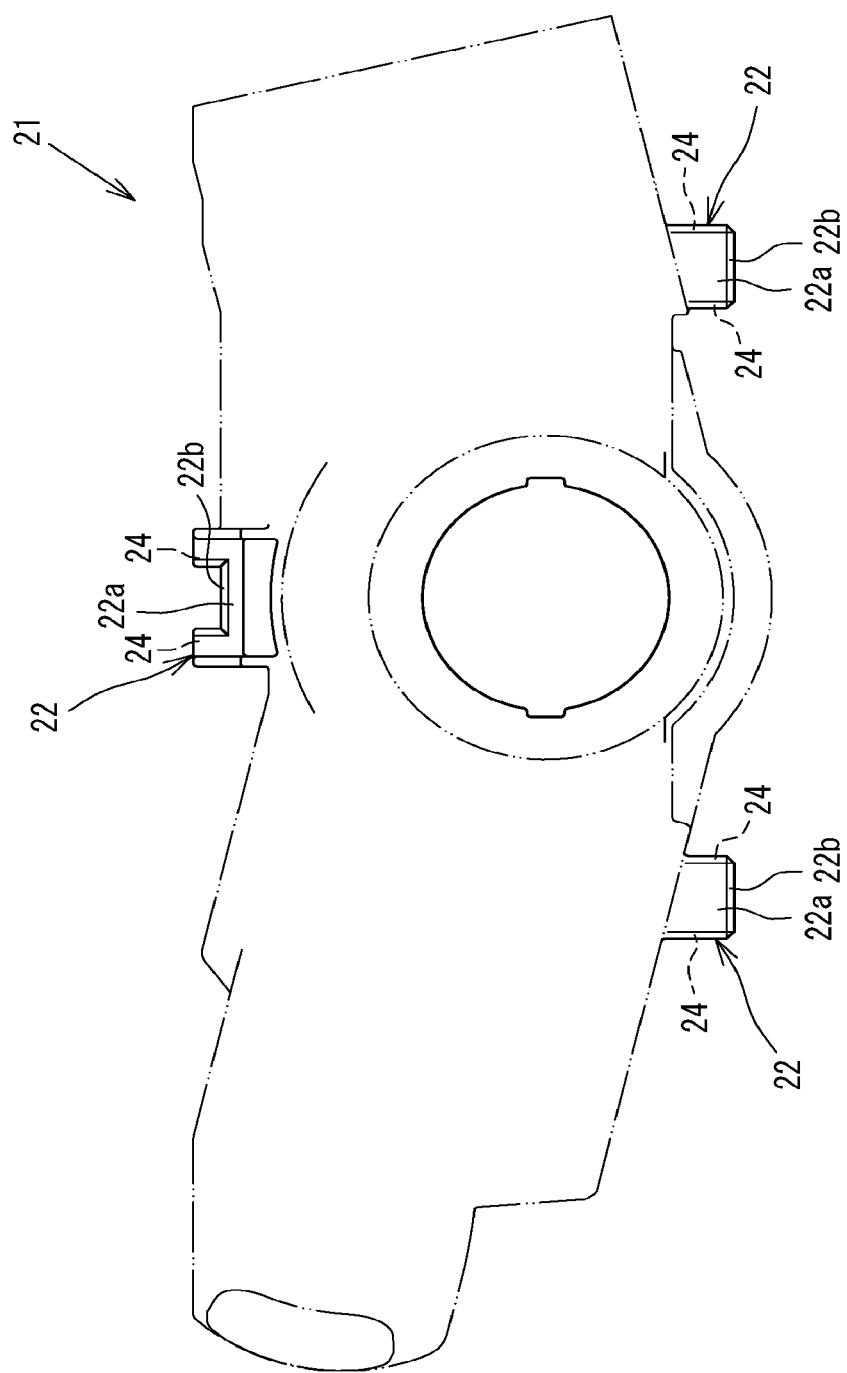
FIG. 2 is a front view showing a main part of a combination switch.

As shown in FIGS. 2 and 3, the receiving portion 22 to which the locking claw 31 is locked may have any shape as long as the receiving portion 22 includes a plate-shaped locked portion 22a to which the locking claw 31 is at least locked, and need not be in the shape of a hole enclosed.

The three receiving portions 22 shown in FIG. 2 are each provided with side walls 24 on both sides of the plate-shaped locked portion 22a so as to regulate the locked locking claw 31. As shown in FIG. 3, the receiving portion 22 out of the three receiving portions 22 which is located near the connector housing 14 of the stator 12 includes the side walls 24 on the back side of the locked portion 22a, namely, on the surface in the insertion direction, the side walls 24 regulating the tip side portion of the locking claw 31. The other one receiving portion 22 includes the side walls 24 projecting outward on both sides of the locked portion 22a and surrounded by three sides. A chamfered surface 22b is formed at the insertion-side edge of any of the locked portions 22a.

The forming position of the projecting piece 15 is set in the relationship with the receiving portion 22 such that when the contact surface 32 of the locking claw 31 comes into contact with the locking side corner 23 of the locked portion 22a in the receiving portion 22 as described above, the urging force is exerted on the receiving portion 22. Specifically, as indicated by imaginary lines in FIG. 3, the positional relationship between the projecting piece 15 and the receiving portion 22 is set so that the locking side corner 23 of the receiving portion 22 is located at such a position as to interfere with the contact surface 32 in a normal state. The degree of interference is appropriately set in accordance with the flexibility (elasticity) of the urging portion 15a, the size and shape of the locking claw 31, and the like.

The configuration of the projecting pieces 15 as described above is adopted to at least the two projecting pieces 15 at the positions near the connector housings 14 (cf. FIG. 1) out of the three projecting pieces 15. This is because a harness (not shown) is connected to the connector housing 14, and there is a high possibility that a portion near the connector housing 14 will be lifted due to the wiring state of the harness. The projecting piece 15 with the configuration described above may be used for the projecting pieces 15 at all the positions.

In the fixing structure of the rotary connector 11 configured as thus described, fixing can be performed by moving the rotary connector 11 with respect to the combination switch 21 so as to insert the projecting piece 15 into the receiving portion 22.

Figure 4:
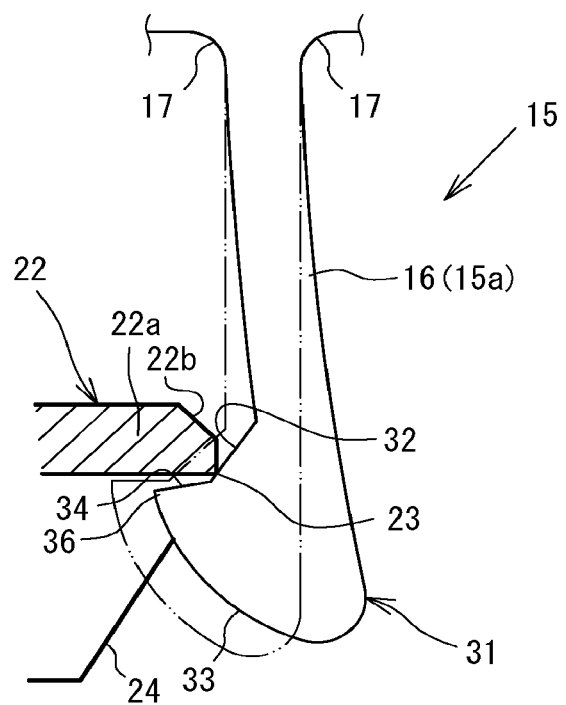
FIG. 4 is a sectional view of a locked state of the fixing structure.

When the projecting piece 15 is moved from the state indicated by a solid line in FIG. 3 toward the receiving portion 22, the driven surface 33 of the locking claw 31 of the projecting piece 15 hits the chamfered surface 22b of the receiving portion 22 and the urging portion 15a, namely, the rod-like portion 16 bends rearward. Due to this bending, the locking claw 31 moves laterally away from the locked portion 22a. That is, the displaced locking claw 31 is able to pass through the locked portion 22a of the receiving portion 22, and when the locking claw 31 passes through the locked portion 22a, the urging portion 15a tends to return elastically. At this time, the protrusion 36 of the locking claw 31 is displaced from the locking side corner 23 of the receiving portion 22 with great strength, and it can be recognized by vibration and sound that the locking claw 31 has passed over the locked portion 22a of the receiving portion 22. The urging portion 15a, which tends to elastically return, displaces the locking claw 31 in the locking direction, namely, toward the locked portion 22a, and as shown in FIG. 4, the urging portion 15a brings the contact surface 32 into contact with the locking side corner 23 of the locked portion 22a. By this contact, the positional relationship between the projecting piece 15 and the receiving portion 22 is held. At this time, since the contact surface 32 is formed in such a position as to bend the urging portion 15a in the contact state and exert the urging force on the locking side corner 23 of the locked portion 22a, the urging portion 15a does not return to the normal state and the urging force by the urging portion 15a remains acting.

Hence the lifting of the rotary connector 11 is prevented together with looseness. In addition, with the contact surface 32 being the inclined surface, the contact surface 32 is steplessly locked to the locked portion 22a, so that it is possible to perform reliable fixing irrespective of tolerance and the like, and further to ensure the fixing strength by favorable action of the urging force by the urging portion 15a.

As described above, the protrusion 36 of the locking claw 31 notifies the passing of the locking claw 31 through the locked portion 22a to a person performing the fixing work with tactile and sound, and the protrusions 36 having once passed over the locked portion 22a reliably prevents the rotary connector 11 from being lifted above a certain level.

The projecting piece 15 has the configuration where the section closer to the base side than the locking claw 31 is taken as the urging portion 15a and tilts while bending as described above, whereby the deforming motion of the urging portion is simple, and the overall shape the projecting piece 15 can be simplified. Hence it is possible to hold the manufacturing cost low and improve the manufacturing accuracy.

When the rotary connector 11 is to be removed, an appropriate jig such as a driver is hooked on a recess 35 formed in the locking claw 31 to displace the locking claw 31 in the direction in which the locking is released.

As described above, the fixing work for the rotary connector 11 is very simple as just to move the projecting piece 15 of the rotary connector 11 so as to be inserted into the receiving portion 22. In the locked state, the contact surface 32 of the locking claw 31 is maintained in the state of being pressed by the urging force by the urging portion 15a, so that unexpected lifting can be prevented as well as looseness of the rotary connector 11. Moreover, the structure for this purpose is obtained by the configuration of the projecting piece 15 and the locking claw 31 and the setting of the positional relationship between the projecting piece 15 and the receiving portion 22, in other words, the setting of the interference amount between the contact surface 32 and the receiving portion 22, so that unlike the conventional structure using the displacement absorbing member, it is possible to reduce the increase in size and manufacturing cost of the rotary connector 11 and the portion to fix the rotary connector 11. There is no possibility of deterioration in material as in the case where the cushioning material is provided as the displacement absorbing member and there is an effect that a desired effect can be maintained for a long period.

Hereinafter, another example of the fixing structure of the rotary connector 11 will be described. In this description, the same reference numerals are given to the same or similar sections as those in the configuration described above, and a detailed description thereof will be omitted.

Figure 6:
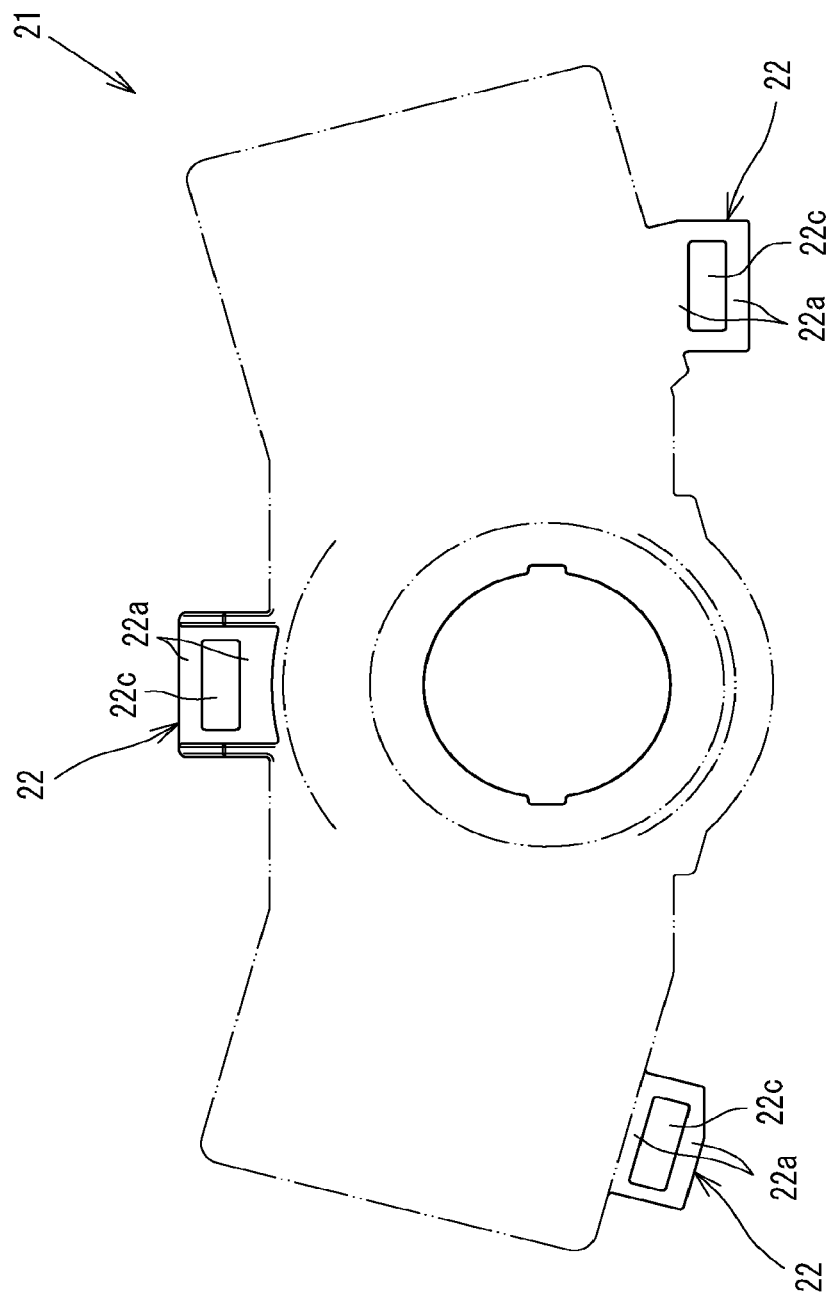
FIG. 6 is a front view showing a main part of a combination switch.

FIG. 5 shows a separated state of the projecting piece 15, constituting the fixing structure of the rotary connector 11, and the receiving portion 22. The projecting piece 15 in this fixing structure is formed by laterally forming a pair of contact surfaces 32 of the locking claw 31, and the receiving portion 22 has a hole shape as shown in FIG. 6, namely, an enclosed shape.

The projecting piece 15 is provided with the locking claw 31 in the form of a substantially rhombic frame which protrudes on laterally both right and left sides at the tip of the rod-like portion 16 as the urging portion 15a. Two claw rear end side portions 37 are provided in base side portion of the locking claw 31 so as to be branched at the same inclination. An angle of inclination of the claw rear end side portion 37 is appropriately set to, for example, about 30 degrees with respect to the long length direction of the projecting piece 15. The outside surface of each of these claw rear end side portions 37 is the contact surface 32. That is, the pair of contact surfaces 32 of the locking claw 31 are formed laterally outward. The contact surface 32 in the illustrated example is formed of a flat inclined surface, but the contact surface 32 may be formed of a concave rounded surface.

The claw tip side portion 38 are extended from the tips of the two claw rear end side portions 37 which are opened forward, and the tips of the claw tip side portions 38 converge and are in contact with each other. The claw tip side portion 38 forms the tip of the projecting piece 15, and has a shape being substantially triangular in a side view and tapered. These two claw tip side portions 38 and sections in contact therewith are the urging portions 15a together with the rod-like portions 16. That is, in addition to the rod-like portion 16, the claw tip side portion 38 which is a section connecting the pair of contact surfaces 32 and the part in contact therewith are also the urging portion 15a. With the projecting piece having such a configuration, a plurality of urging portions 15a are provided in the long length direction of the projecting piece 15.

Regulation shafts 39 extending in the long length direction of the projecting piece 15 are formed on the axial center of the rod-like portion 16 in the locking claw 31, namely, at horizontally intermediate positions between the claw rear end side portions 37 and between the claw tip side portion 38, respectively. The regulation shafts 39 are formed so as not to contact each other in a normal state, in other words, so as to form a gap therebetween. These regulation shafts 39 are for preventing the locking claws 31 from being deformed to be flattened more than necessary and being unable to be inserted into the receiving portion 22 at the time of the insertion of the locking claws 31, and the length of the regulation shaft 39 is set so as to achieve this purpose.

The receiving portion 22 for receiving the locking claw 31 of such a projecting piece 15 has a hole shape as shown in FIG. 6. That is, the receiving portion 22 has a rectangular through hole 22c in a front view, and two long sides of the through hole 22c are oriented horizontally or substantially horizontally. These long sides are locked portions 22a provided in parts facing each other in one hole, and the contact surfaces 32 of the locking claw 31 come into contact therewith. The contact surface 32 is set so as to appropriately interfere with the locking side corner 23 of the receiving portion 22 in a normal state.

In the fixing structure of the rotary connector 11 with such a configuration, when the locking claw 31 of the projecting piece 15 is inserted into the receiving portion 22, the locking claw 31 hits the locked portion 22a of the hole edge of the receiving portion 22, and enters the receiving portion 22 while being elastically deformed into a thin shape by the driven surface 33 of the claw tip side portion 38. The tip of the locking claw 31, namely, the claw tip side portion 38, has a triangular shape and hence smooth insertion can be achieved even if the insertion position is displaced. Even if the claw tip side portion 38 may spread flatly at the time of insertion, the end faces of the regulation shaft 39 come into contact with each other to prevent such deformation, so that the locking claw 31 is kept in the original long rhomboid shape. This enables reliable insertion into the receiving portion 22.

Figure 7:
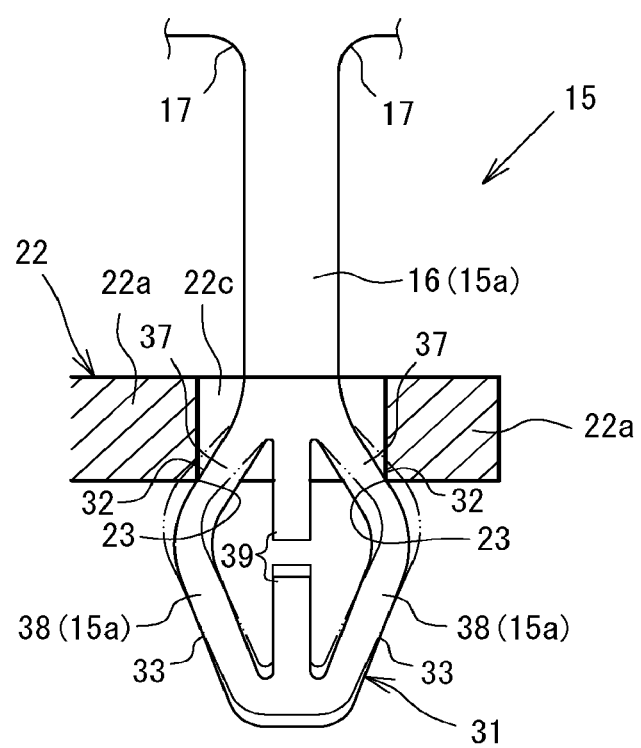
FIG. 7 is a sectional view showing a locked state of the fixing structure shown in FIG. 5.

When the claw tip side portion 38 and the claw rear end side portion 37 are deformed to be narrow as the locking claws 31 are inserted and a boundary part between the claw tip side portion 38 and the claw rear end side portion 37, namely, a part most laterally protruding out of the locking claws 31, passes through the locked portion 22a of the receiving portion 22, as shown in FIG. 7, the outside surface of the claw rear end side portion 37, namely, the contact surface 32, comes into contact with the locking side corner 23 of the receiving portion 22. Then, since the claw tip side portion 38 and the claw rear end side portion 37 tends to elastically return, the contact surface 32 strongly hits on the locking side corner 23 of the locked portion 22a in the receiving portion 22, and the positional relationship between the projecting piece 15 and the receiving portion 22 is held without looseness.

In the contact state, the contact surface 32 is formed in a position where the urging portion 15a, which is mainly the claw tip side portion 38 and the part in contact therewith in this case, is bent to exert the urging force on the locked portion 22a, and hence the urging force always acts in the contact state. Moreover, the locking with the urging force in action can be performed simultaneously at two places which are laterally both sides. It is thus possible to increase the urging force, make the stability at the time of fixing favorable, and obtain a stronger fixed state. Therefore, even if a force to lift the rotary connector 11 acts due to the harness, it is possible to strongly prevent the lifting, as well as looseness.

In addition, since the contact surface 32 is the inclined surface, the contact surface 32 is steplessly locked to the locked portion 22a. Hence it is possible to perform reliable fixing irrespective of a production error and tolerance, and further to ensure the fixing strength by favorable action of the urging force by the urging portion 15a.

Further, the tip of the locking claw 31, namely, the claw tip side portion 38 has a triangular shape that is easy to insert without being caught. Hence the workability is favorable and a reliable and favorable locked state can be obtained easily.

At the time of removing the rotary connector 11, an appropriate jig such as a driver is hooked in a space formed in the locking claw 31, such as a gap between the regulation shafts 39, or the locking claw 31 is pinched, to bend the locking claw 31 in the direction in which the locking is released.

Figure 8A:
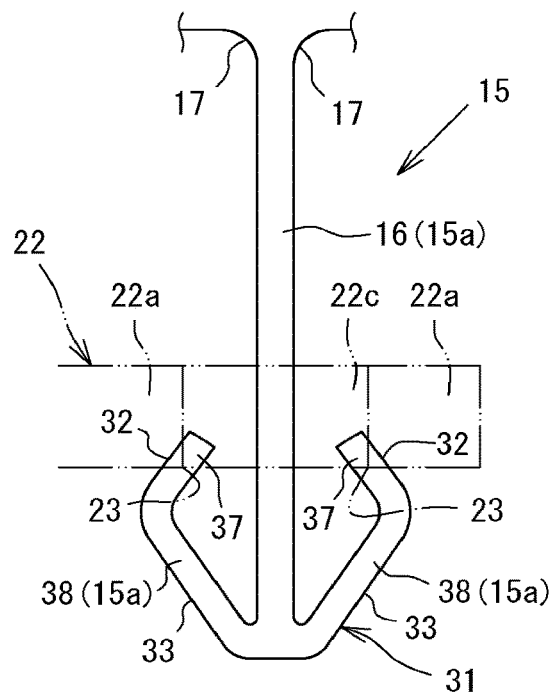
FIG. 8A is a side view of a projecting piece in a fixing structure according to another example.

FIG. 8A shows the relationship between the projecting piece 15, constituting the fixing structure of the rotary connector 11, and the receiving portion 22. The projecting piece 15 in this fixing structure is formed by laterally forming a pair of contact surfaces 32 of the locking claw 31, and the receiving portion 22 has the hole shape as shown in FIG. 6.

The projecting piece 15 is provided with the locking claw 31 which protrudes on laterally both right and left sides at the tip of the rod-like portion 16 as the urging portion 15a. The locking claw 31 includes the claw tip side portion 38 extending obliquely in a direction to the base of the rod-like portion 16 while protruding laterally from the tip of the rod-like portion 16, and the claw rear end side portion 37 extending obliquely from the rear end of the claw tip side portion 38 toward the rod-like portion 16. The rear end of the claw rear end side portion 37 is a free end, and there is a gap for elastic deformation between the tip of the claw rear end side portion 37 and the rod-like portion 16.

The base of the claw tip side portion 38 and the adjacent claw rear end side portion 37 constitute a flexible urging portion 15a that displaces and urges the locking claw 31 in the locking direction. Further, the outside surface of the claw rear end side portion 37 is the contact surface 32, and a pair of contact surfaces 32 are formed laterally outward. These contact surfaces 32 are set so as to interfere with the locking side corners 23 of the receiving portion 22 in a normal state.

Figure 8B:
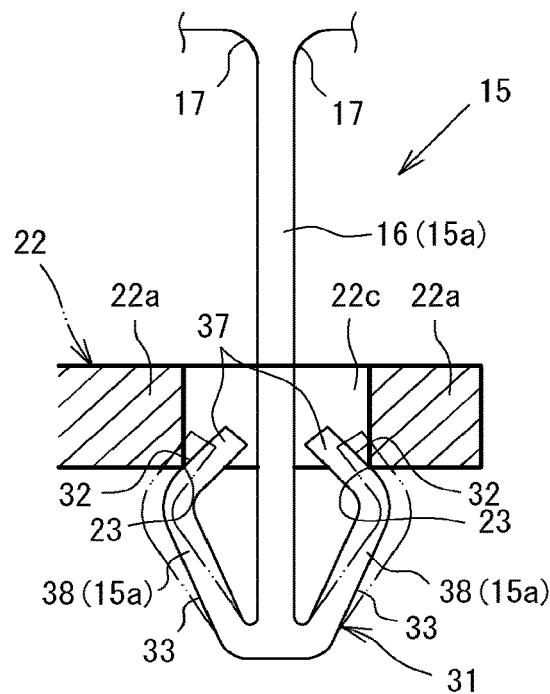
FIG. 8B is a sectional view thereof in a fixed state.

In the fixing structure of the rotary connector 11 with such a configuration, when the locking claw 31 of the projecting piece 15 is inserted into the receiving portion 22, the locking claw 31 hits the locked portion 22a at the hole edge of the receiving portion 22 and enters the receiving portion 22 while elastically deforming the right and left claw tip side portions 38 in the closing direction together with the claw rear end side portions 37. When the claw tip side portion 38 passes through the locked portion 22a of the receiving portion 22, as shown in FIG. 8B, the claw tip side portion 38 tends to elastically return in the opening direction, bringing the contact surface 32 of the claw rear end side portion 37 into contact with the locking side corner 23 of the receiving portion 22. This contact state is maintained with the urging force by the claw tip side portion 38 which is the urging portion 15a and the base of the claw rear end side portion 37 adjacent thereto.

Thereby, the positional relationship between the projecting piece 15 and the receiving portion 22 is held without looseness, and the lifting of the rotary connector 11 is prevented. Other than this, the above fixing structure has a similar effect to the fixing structure shown in FIG. 7

At the time of removing the rotary connector 11, an appropriate jig such as a driver is hooked in a space formed in the locking claw 31, namely, a gap between the rod-like portion 16 and the claw tip side portion 38, or the locking claw 31 is pinched, to bend the locking claw 31 in the direction in which the locking is released.

Figure 9:
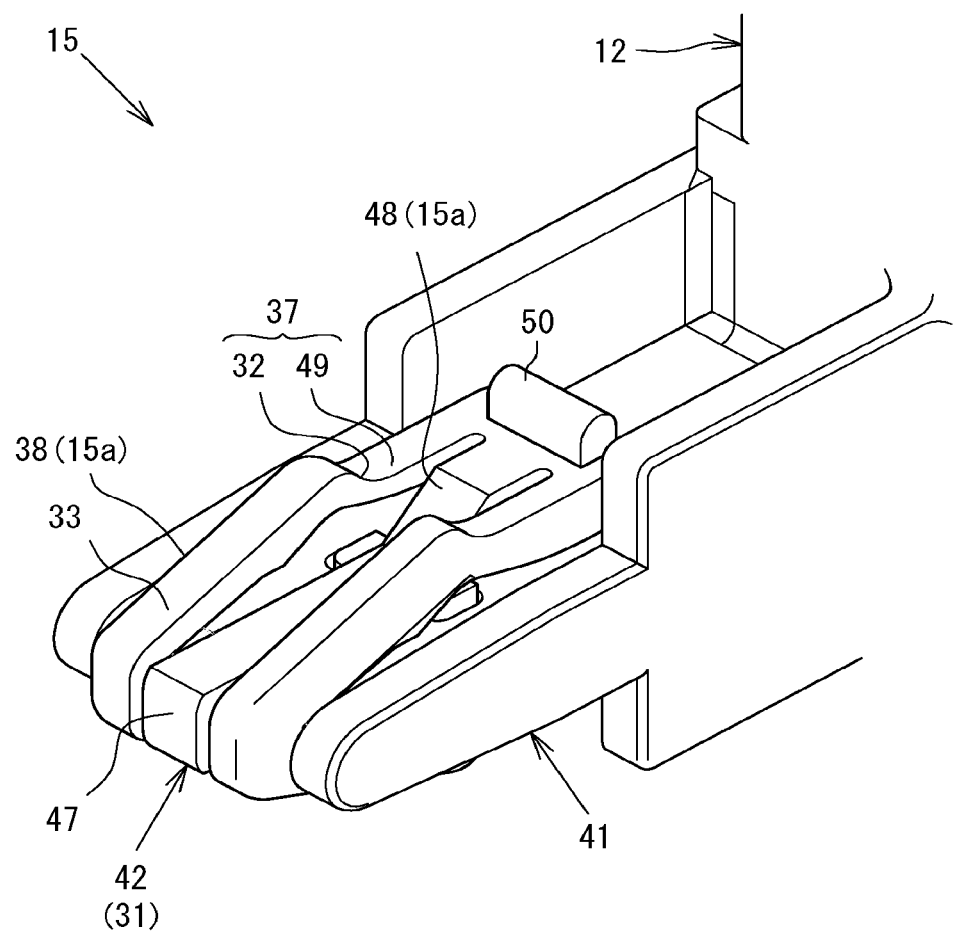
FIG. 9 is a perspective view of a projecting piece of a fixing structure according to another example.

FIG. 9 is a perspective view of the projecting piece 15 constituting the fixing structure of the rotary connector 11. The projecting piece 15 is an example of constituting a locking structure using two members, the locking structure being similar to the two examples described above, namely, the example shown in FIGS. 5 and 7 and the example shown in FIGS. 8A and 8B.

The projecting piece 15 is made up of a projecting piece member 41 integrally formed on the stator 12 and a locking claw member 42 attached to the tip portion of the projecting piece member 41. The locking claw member 42 is a part constituting the locking claw 31.

Figure 10:
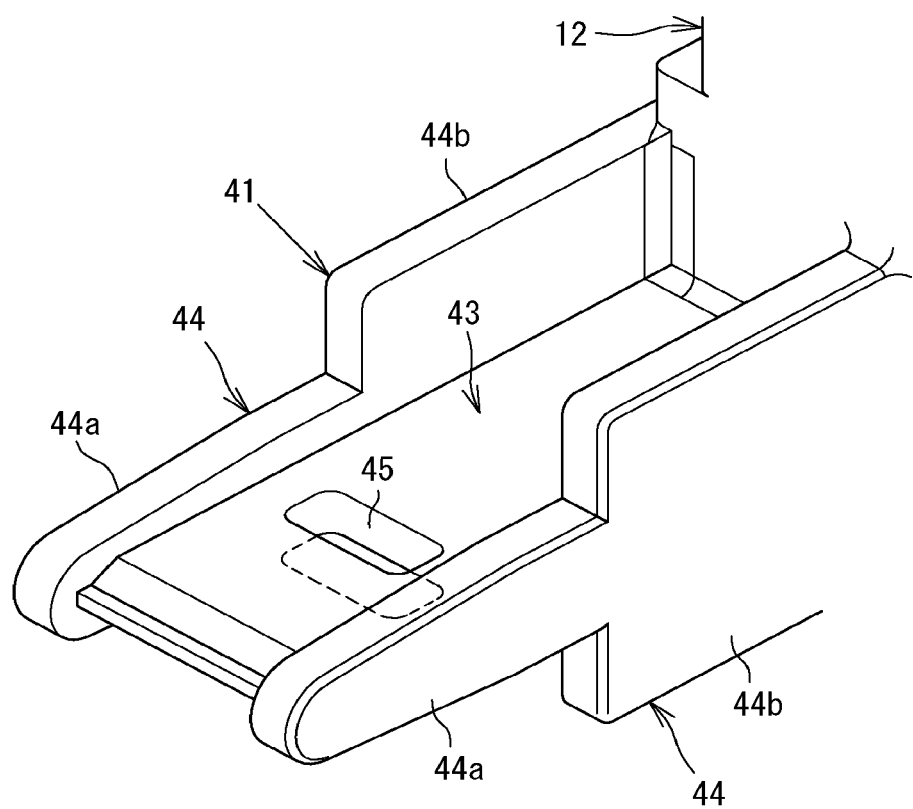
FIG. 10 is a perspective view showing a part of the projecting piece of FIG. 9.

As shown in FIG. 10, the projecting piece member 41 includes a body plate portion 43 extending in the form of a narrow plate, and regulation walls 44 rising on both front and back surfaces of the body plate portion 43 at both side edges thereof. The body plate portion 43 has a holding hole 45 penetrating in the thickness direction at the tip side portion, and the tip portion is formed to be small in thickness. The regulation wall 44 is for regulating the attitude of the locking claw member 42 to be held. Of the regulation wall 44, a tip-side part 44a to be inserted into the receiving portion 22 (cf. FIG. 7) is formed to have a small height so as to be inserted into the receiving portion 22, and a rear-end-side part 44b not to be inserted into the receiving portion 22 is formed to have a large height.

Figure 12:
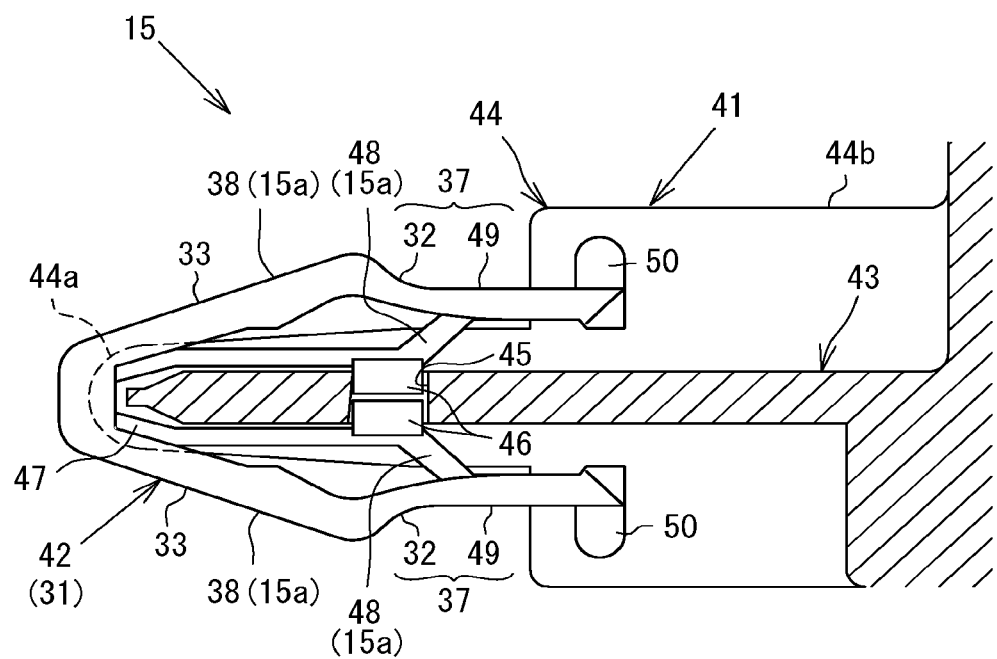
FIG. 12 is a sectional view of the projecting piece of FIG. 9.

As shown in a side view of FIG. 11A and a plan view of FIG. 11B, the locking claw member 42 has such a shape as to cover the front and back surfaces of the body plate portion 43 of the projecting piece member 41. In the locking claw member 42, two fitting portions 46 in a substantially rectangular parallelepiped block shape to be held in the holding hole 45 of the body plate portion 43 is provided so as to face each other with a gap therebetween, and a holding frame 47 is continuously provided in an intermediate portion in the width direction of parts in the fitting portions 46 which protrude from the holding hole 45, the holding frame 47 integrally coupling the fitting portions 46 while extending to the tip side, and being attached to a part closer to the tip side portion of the body plate portion 43 than the holding hole 45, as shown in FIG. 12. At the rear end of the holding frame 47, an elastic support portion 48 is formed which serves as the urging portion 15a for urging the locking claw 31 in the locking direction, the elastic support portion 48 extending rearward obliquely outward and then extending rearward.

On both the right and left sides of the tip of the elastic support portion 48, the claw rear end side portions 37 are continuously provided with a gap therebetween, and at the tip of the claw rear end side portion 37, the claw tip side portion 38 is formed with a gap between the holding frame 47 and the claw tip side portion 38. The claw tip side portions 38 making a pair with the body plate portion 43 interposed therebetween are coupled at the tip. In the claw rear end side portion 37, the contact surface 32 with its outer surface formed of a concave rounded surface is provided in the tip side portion, and on the rear end side from the part having the contact surface 32, a rear end side portion 49 is continuously provided extending along the body plate portion 43 in the state of having a gap rearward between the body plate portion 43 and the rear end side portion 49. The rear end of the rear end side portion 49 is continuously provided integrally with the holding frame 47 in the width direction, and a convex portion 50 for operation which protrudes upward is formed in the intermediate portion.

The pair of claw tip side portions 38 each has a linear outer surface inclined so as to become tapered toward the tip side, namely, the driven surface 33. The claw tip side portion 38 is the urging portion 15a for urging the locking claw 31 together with the elastic support portion 48, specifically, the contact surface 32 thereof in the locking direction. A curved surface is formed between the claw tip side portion 38 and the contact surface 32 of the claw rear end side portion 37.

Figure 13A:
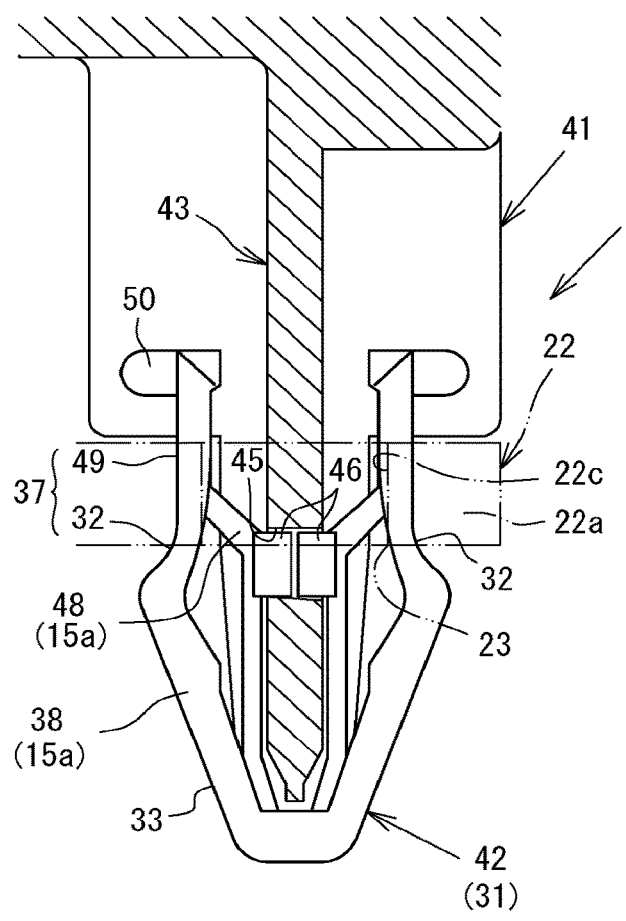
FIG. 13A is a sectional view of the projecting piece in the fixing structure of FIG. 9.

After the fitting portions 46 are separated from each other to open the holding frame 47, the locking claw member 42 as thus described is attached to the body plate portion 43 as shown in FIG. 12. As indicated by an imaginary line in FIG. 13A, the contact surface 32 of the locking claw member 42 is set so as to interfere with the locking side corner 23 of the receiving portion 22.

Figure 13B:
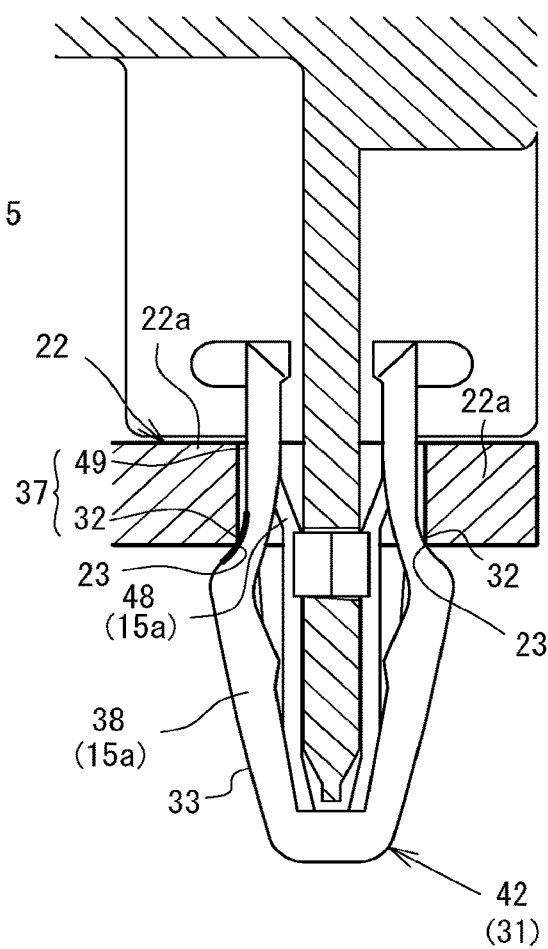
FIG. 13B is a sectional view thereof in a fixed state.

In the fixing structure of the rotary connector 11 including the projecting piece 15 with such a configuration, when the tip side portion of the projecting piece 15 is inserted into the receiving portion 22 together with the locking claw member 42, the locking claw member 42 hits the locked portion 22a at the hole edge of the receiving portion 22 and enters the receiving portion 22 while elastically deforming the right and left claw tip side portions 38 in the closing direction together with the claw rear end side portions 37. Elastic deformation is mainly made by the claw tip side portion 38 and the elastic support portion 48. When the claw tip side portion 38 passes through the receiving portion 22, as shown in FIG. 13B, the claw tip side portion 38 tends to elastically return in the opening direction, bringing the contact surface 32 of the claw rear end side portion 37 into contact with the locking side corner 23 of the receiving portion 22. Mainly the claw tip side portion 38 and the elastic support portion 48 maintain this contact state with the urging force.

Thereby, the positional relationship between the projecting piece 15 and the receiving portion 22 is held without looseness, and the lifting of the rotary connector is prevented. Other than this, the above fixing structure has a similar effect to the fixing structures shown in FIGS. 7 and 8B.

At the time of removing the rotary connector 11, by pinching the locking claw member 42 or the like, the locking claw member 42 is bent in the direction in which the locking is released.

Figure 14A:
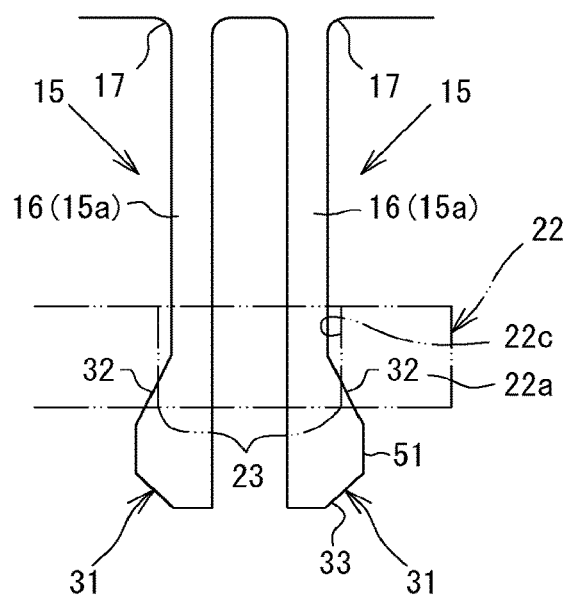
FIG. 14A is a side view of a projecting piece in a fixing structure according to another example.

FIG. 14A shows the relationship between the projecting piece 15, constituting the fixing structure of the rotary connector 11, and the receiving portion 22. In this fixing structure, a pair of projecting pieces 15 having locking claws 31 at the tip portions are juxtaposed with a gap therebetween, a pair of contact surfaces 32 of the locking claws 31 are provided in the lateral direction, and the receiving portion 22 has a hole shape as shown in FIG. 6.

The projecting piece 15 is provided with the locking claw 31 which protrudes on laterally one side at the tip of the rod-like portion 16 as the urging portion 15a. The locking claw 31 includes, from the tip, the planar driven surface 33 inclined rearward obliquely outward, a planar outermost surface 51 extending in the front-rear direction, and the planar contact surface 32 inclined rearward obliquely inward to the rod-like portion 16. As indicated by an imaginary line in FIG. 14A, the contact surface 32 is formed at such a position as to interfere with the locking side corner 23 of the receiving portion 22 in a normal state. The two projecting pieces 15 are arranged in a back-to-back state so that the locking claws 31 face laterally outward.

Figure 14B:
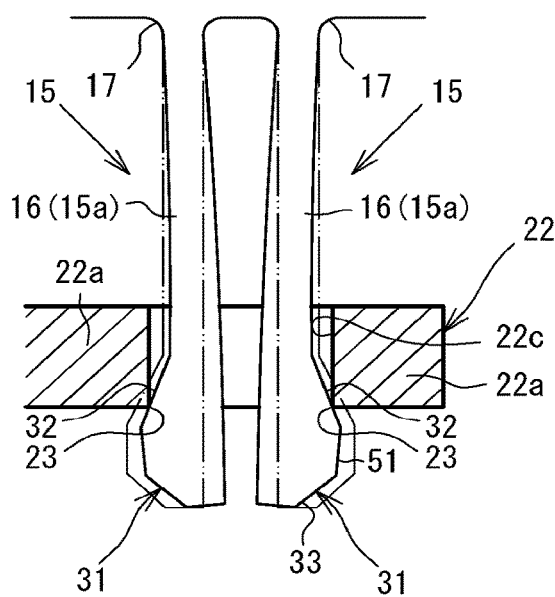
FIG. 14B is a sectional view thereof in a fixed state.

In the fixing structure of the rotary connector 11 with such a configuration, when the locking claws 31 of the two projecting pieces 15 are inserted into the receiving portion 22, the driven surface 33 of the locking claw 31 hits the locked portion 22a of the hole edge of the receiving portion 22, and the locking claw 31 enters the receiving portion 22 while the rod-like portion 16 is elastically deformed in the direction in which the projecting pieces 15 come closer to each other. When the outermost surface 51 of the locking claw 31 passes through the receiving portion 22, as shown in FIG. 14B, the outermost surface 51 tends to elastically return in the direction in which the two projecting pieces 15 are opened, thereby bringing the contact surface 32 of the locking claw 31 into contact with the locking side corner 23 of the receiving portion 22. The rod-like portion 16 as the urging portion 15a maintains this contact state with the urging force.

Thereby, the positional relationship between the projecting piece 15 and the contact surface 32 is held without looseness, and the lifting of the rotary connector 11 is prevented. Other than this, the above fixing structure has a similar effect to the fixing structures shown in FIGS. 7, 8B and 13B.

At the time of removing the rotary connector 11, by pinching the locking claws 31 of the two projecting pieces 15, or the like, the locking claws 31 are bent in the direction in which the locking is released.

Figure 15A:
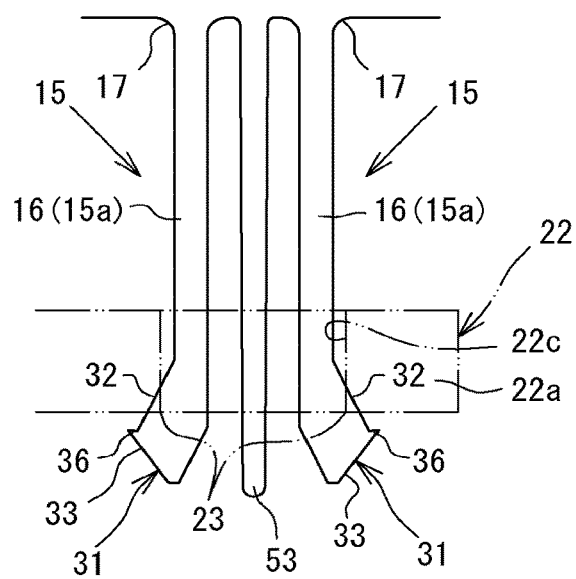
FIG. 15A is a side view of a projecting piece in a fixing structure according to another example.

FIG. 15A shows the relationship between the projecting piece 15 constituting the fixing structure of the rotary connector 11 and the receiving portion 22. In this fixing structure, similarly to the projecting piece 15 of FIG. 14A, two projecting pieces 15 including locking claws 31 at the tip portions are juxtaposed with a gap therebetween, a pair of contact surfaces 32 of the locking claws 31 are provided in the lateral direction, and the receiving portion 22 has a hole shape as shown in FIG. 6.

The projecting piece 15 is provided with the locking claw 31 which protrudes on laterally one side at the tip of the rod-like portion 16 as the urging portion 15a. The tip side of the locking claw 31 is formed in a substantially triangular shape, and the locking claw 31 includes, from the tip, the planar driven surface 33 inclined rearward obliquely outward, the triangular protrusion 36 laterally protruding most of the locking claw 31, and the planar contact surface 32 inclined rearward obliquely inward to the rod-like portion 16.

Since a pair of contact surfaces 32 are provided laterally outward, the two projecting pieces 15 are arranged in a back-to-back state so that the locking claws 31 face outward. As indicated by an imaginary line in FIG. 15A, the contact surfaces 32 are each formed at such a position as to interfere with the locking side corner 23 of the receiving portion 22 in a normal state.

Between the two projecting pieces 15, a rod-like protrusion 53, which regulates biased deformation of the projecting pieces 15, is provided with gaps formed between the projecting pieces 15 and the protrusion 53. The protrusion 53 has such a length as to be able to receive the projecting piece 15 in the relationship with the shape of locking claw 31 upon elastic deformation of the projecting piece 15.

Figure 15B:
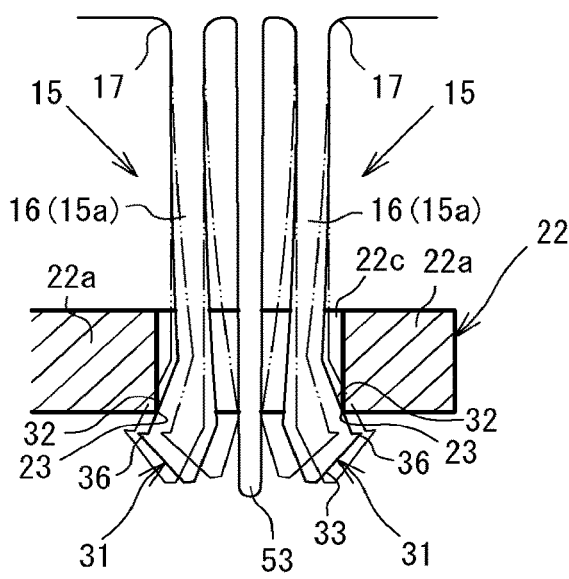
FIG. 15B is a sectional view thereof in a fixed state.

In the fixing structure of the rotary connector 11 with such a configuration, when the locking claws 31 of the two projecting pieces 15 are inserted into the receiving portion 22, the driven surface 33 of the locking claw 31 hits the locked portion 22a of the hole edge of the receiving portion 22, and the locking claw 31 enters the receiving portion 22 while the rod-like portion 16 is elastically deformed in the direction in which the projecting pieces 15 come closer to each other. When the protrusion 36 of the locking claw 31 passes through the receiving portion 22, the protrusion 36 notifies the passing to an operator with vibration and sound. Then, as shown in FIG. 15B, the protrusion 36 tends to elastically return in the direction in which the two projecting pieces 15 are opened, thereby bringing the contact surface 32 of the locking claw 31 into contact with the locking side corner 23 of the receiving portion 22. The rod-like portion 16 as the urging portion 15a maintains this contact state with the urging force.

Thereby, the positional relationship between the projecting piece 15 and the receiving portion 22 is held without looseness, and the lifting of the rotary connector 11 is prevented. Other than this, the above fixing structure has a similar effect to the fixing structures shown in FIGS. 7, 8B, 13B, and 14B.

At the time of removing the rotary connector 11, by pinching the locking claws 31 of the two projecting pieces 15, or the like, the locking claws 31 are bent in the direction in which the locking is released.

Figure 16A:
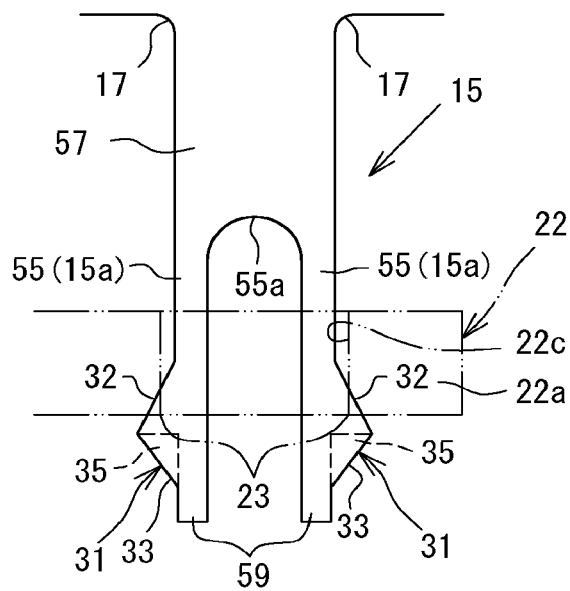
FIG. 16A is a side view of a projecting piece in a fixing structure according to another example.

FIG. 16A shows the relationship between the projecting piece 15 constituting the fixing structure of the rotary connector 11 and the receiving portion 22. In this fixing structure, the tip side of one projecting piece 15 is divided into two pieces with a gap therebetween to form branch portions 55, and locking claws 31 are formed at the tip portions of the branch portions 55 to obtain a pair of locking claws 31. The receiving portion 22 has a hole shape as shown in FIG. 6.

The projecting piece 15 is provided with a rod-like base 57, and two branch portions 55 extend straight forward to the tip side of the base 57. In the illustrated example, the base 57 is made thick, so that the branch portion 55 functions as the urging portion 15a. The urging force of the branch portion 55 can be adjusted by the length of the branch portion 55 in addition to a material or the like.

The lower ends of the opposing surfaces of the branch portions 55 are continuously connected by a concave curved surface 55a. The tip portions of the branch portions 55 are each provided with the locking claw 31 protruding on laterally one side. The locking claw 31 has a substantially triangular shape and includes, sequentially from the tip, a projecting piece 59 for operation which projects to the tip side, the planar driven surface 33 inclined rearward obliquely outward, and the planar contact surface 32 inclined rearward obliquely inward to the branch portion 55. The branch portion 55 and the curved surface 55a, which are sections connecting the contact surfaces 32, constitute the urging portion 15a.

Since a pair of contact surfaces 32 are provided laterally outward, the two branch portions 55 are arranged in a back-to-back state so that the locking claws 31 face outward. As indicated by an imaginary line in FIG. 16A, the contact surfaces 32 are each formed at such a position as to interfere with the locking side corner 23 of the receiving portion 22 in a normal state.

Figure 16B:
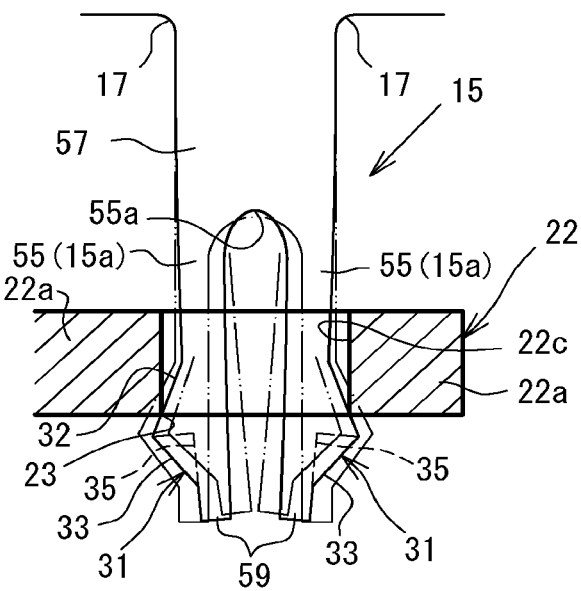
FIG. 16B is a sectional view thereof in a fixed state.
Figure 17:
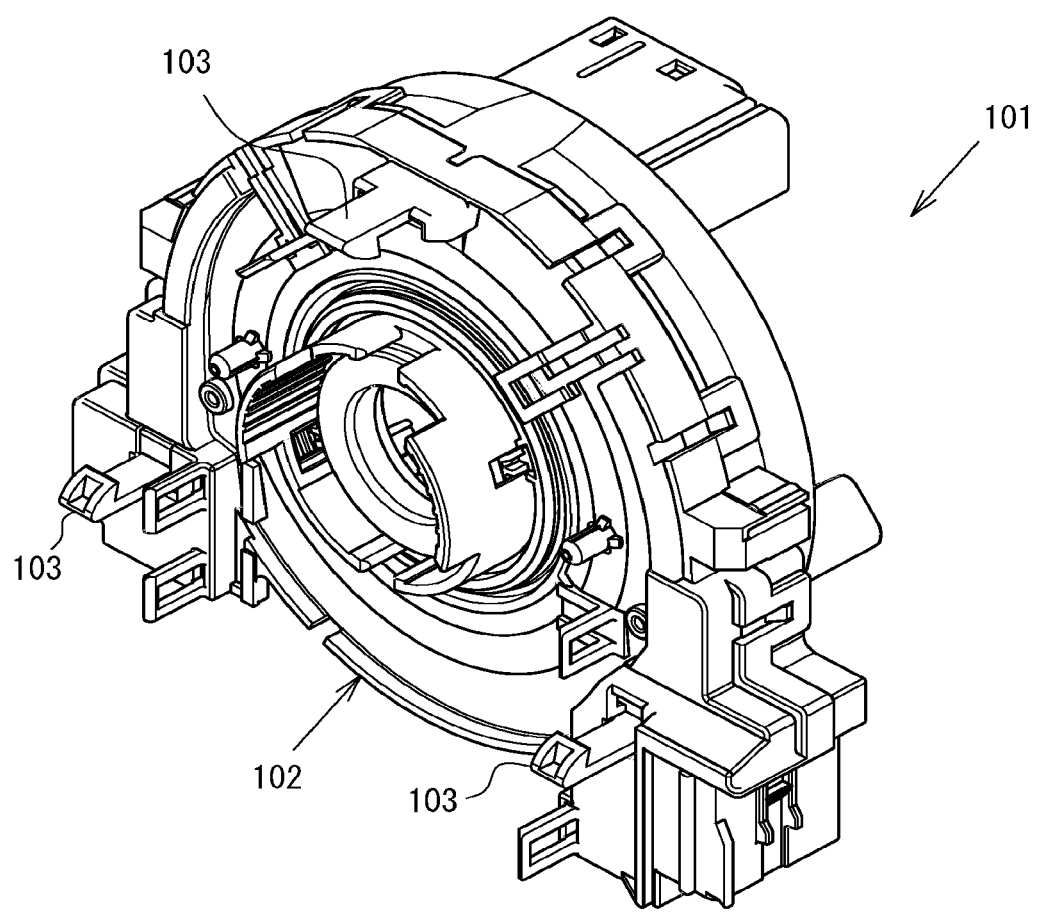
FIG. 17 is a perspective view showing a lower surface side of a rotary connector according to a prior art
Figure 18:
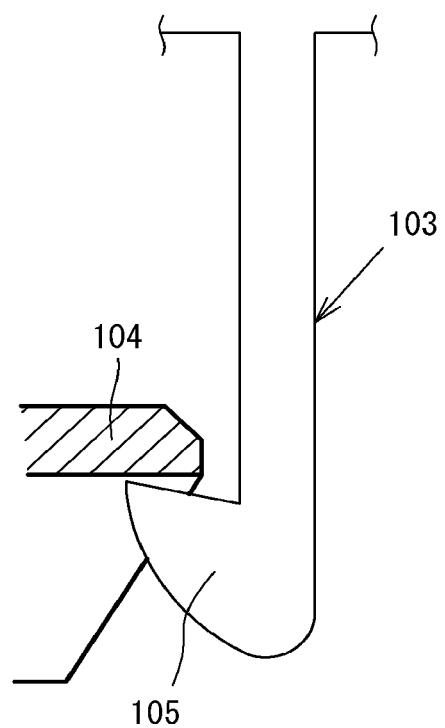
FIG. 18 is a sectional view showing a locked state of a fixing structure according to the prior art.
Figure 19:
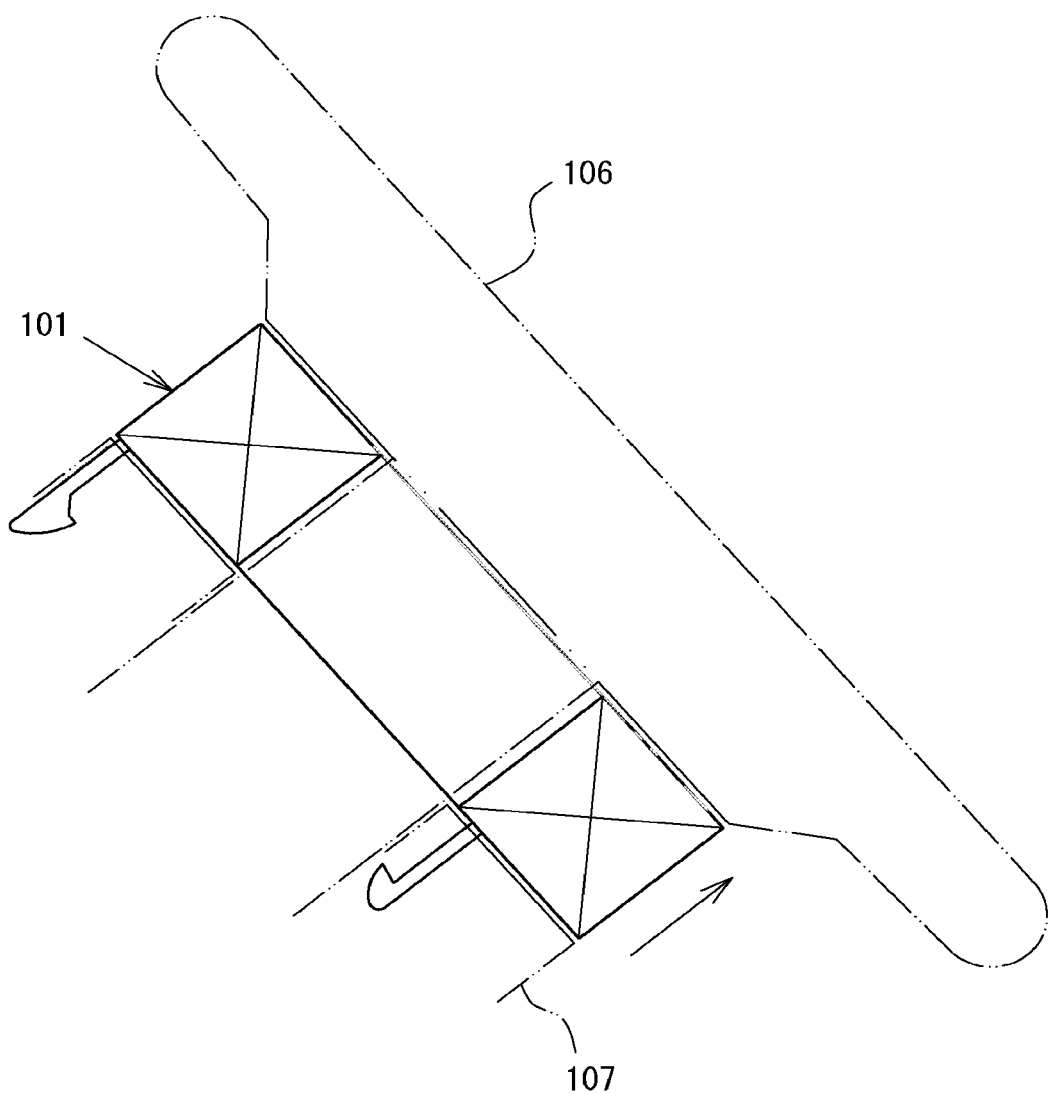
FIG. 19 is a side view showing a schematic structure of a fixed part of the rotary connector according to the prior art.

In the fixing structure of the rotary connector 11 with such a configuration, when the locking claws 31 of the projecting pieces 15 are inserted into the receiving portion 22, the driven surface 33 of the locking claw 31 hits the locked portion 22a of the hole edge of the receiving portion 22, and enters the receiving portion 22 while being elastically deformed in the direction in which the branch portions 55 come closer to each other. When the driven surface 33 of the locking claw 31 passes through the receiving portion 22, as shown in FIG. 16B, the driven surface 33 tends to elastically return in the direction in which the two branch portions 55 are opened, thereby bringing the contact surfaces 32 of the pair of the locking claws 31 into contact with the locking side corners 23 of the receiving portion 22. The branch portion 55 as the urging portion 15a maintains this contact state with the urging force.

Thereby, the positional relationship between the projecting piece 15 and the receiving portion 22 is held without looseness, and the lifting of the rotary connector 11 is prevented. Other than this, the above fixing structure has a similar effect to the fixing structures shown in FIGS. 7, 8B, 13B, 14B, and 15B.

At the time of removing the rotary connector 11, an appropriate jig is hooked in the recess 35 of the locking claw 31 or the projecting piece 59 having the two locking claws 31 formed at the tip is pinched, to bend the branch portions 55 in the direction in which the locking is released.

The above configuration is a configuration of one embodiment for carrying out the present invention, the present invention is not limited to the configuration described above, and other configurations can be adopted.

For example, in the case of laterally forming a pair of contact surfaces, a pair of contact surfaces may face inward rather than outward.

DESCRIPTION OF REFERENCE SIGNS

- 11: Rotary connector
- 15: Projecting piece
- 15a: Urging portion
- 21: Combination switch
- 22: Receiving portion
- 22a: Locked portion
- 23: Locking side corner
- 31: Locking claw
- 32: Contact surface
- 36: Protrusion

The invention claimed is:

1. A rotary connector, comprising:
   a rotator; and
   a stator supporting the rotator and having a projecting piece to be fixed to a combination switch,
   wherein the projection piece includes a projection piece member integrally formed on the stator, and a locking claw member attached to a tip portion of the projecting piece member and comprising a locking claw and a flexible urging portion such that the flexible urging portion is configured to displace and urge the locking claw in a locking direction, and the locking claw member has a contact surface that obliquely comes into contact with a locked portion of the combination switch.

2. The rotary connector according to claim 1, wherein the contact surface is an inclined surface or a concave rounded surface.

3. The rotary connector according to claim 1, wherein the flexible urging portion is formed in a part closer to a base side than the locking claw in the projecting piece.

4. The rotary connector according to claim 1, wherein the contact surface is formed in a pair such that the pair of contact surfaces is formed laterally.

5. The rotary connector according to claim 4, wherein the flexible urging portion is formed in a section connecting the pair of contact surfaces.

6. The rotary connector according to claim 5, wherein the section connecting the pair of contact surfaces forms a tip of the projecting piece.

7. The rotary connector according to claim 1, wherein a protrusion that laterally protrudes most of the locking claw is continuously formed at an angle smaller than 180 degrees from the contact surface near a tip position in an insertion direction of the contact surface in the locking claw.

8. A fixing structure of a rotary connector, comprising:
   a projecting piece configured to fix a rotary connector to a combination switch; and
   a locked portion configured to be locked by the projecting piece,
   wherein the projection piece includes a projection piece member integrally formed on a stator, and a locking claw member attached to a tip portion of the projecting piece member and comprising a flexible urging portion such that the flexible urging portion is configured to displace and urge the locking claw in a locking direction, and the locking claw member has a contact surface that obliquely comes into contact with a locked portion of the combination switch.

9. The rotary connector according to claim 2, wherein the flexible urging portion is formed in a part closer to a base side than the locking claw in the projecting piece.

10. The rotary connector according to claim 2, wherein the contact surface is formed in a pair such that the pair of contact surfaces is formed laterally.

11. The rotary connector according to claim 3, wherein the contact surface is formed in a pair such that the pair of contact surfaces is formed laterally.

12. The rotary connector according to claim 9, wherein the contact surface is formed in a pair such that the pair of contact surfaces is formed laterally.

13. The rotary connector according to claim 10, wherein the flexible urging portion is formed in a section connecting the pair of contact surfaces.

14. The rotary connector according to claim 11, wherein the flexible urging portion is formed in a section connecting the pair of contact surfaces.

15. The rotary connector according to claim 12, wherein the flexible urging portion is formed in a section connecting the pair of contact surfaces.

16. The rotary connector according to claim 13, wherein the section connecting the pair of contact surfaces forms a tip of the projecting piece.

17. The rotary connector according to claim 14, wherein the section connecting the pair of contact surfaces forms a tip of the projecting piece.

18. The rotary connector according to claim 15, wherein the section connecting the pair of contact surfaces forms a tip of the projecting piece.

19. The rotary connector according to claim 2, wherein a protrusion that laterally protrudes most of the locking claw is continuously formed at an angle smaller than 180 degrees from the contact surface near a tip position in an insertion direction of the contact surface in the locking claw.

20. The rotary connector according to claim 3, wherein a protrusion that laterally protrudes most of the locking claw is continuously formed at an angle smaller than 180 degrees from the contact surface near a tip position in an insertion direction of the contact surface in the locking claw.

* * * * *